INVENTOR.
HUGH K. HOWERTON
BY Herman L. Gordon
ATTORNEY

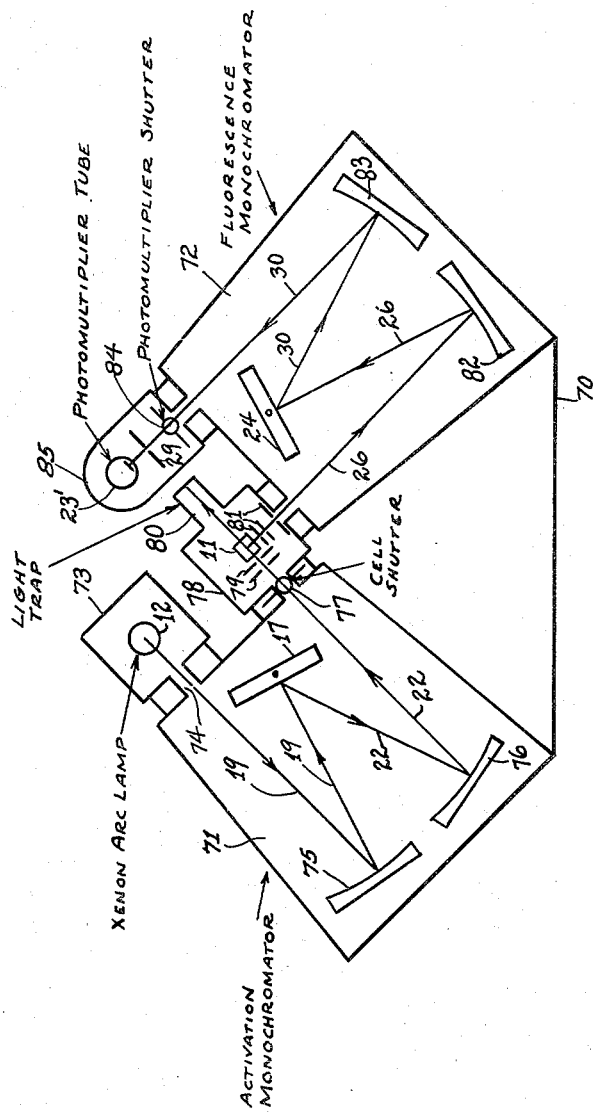

United States Patent Office 2,971,429
Patented Feb. 14, 1961

2,971,429

SPECTRO-FLUORESCENCE MEASURING INSTRUMENT

Hugh K. Howerton, Silver Spring, Md., assignor to American Instrument Company, Inc., Silver Spring, Md.

Filed Feb. 6, 1957, Ser. No. 638,572

3 Claims. (Cl. 88—14)

This invention relates to spectrometry, and more particularly to an instrument for measuring the fluorescent response of materials when excited by various wavelengths of visible and ultra-violet radiation, or when excited by one particular wavelength.

A main object of the invention is to provide a novel and improved apparatus for spectrometrically analyzing fluorescent materials and for determining the response of such materials to radiation.

A further object of the invention is to provide an improved spectro-fluorescence measuring instrument which is simple in construction, which is easy to operate, and which permits rapid quantitative assays of the fluorescent properties of materials.

A still further object of the invention is to provide an improved spectro-fluorescence measuring instrument which involves relatively few parts, which covers substantially the entire range of visible radiation, which is compact in size, and which requires no special skill to operate.

A still further object of the invention is to provide an improved instrument for measuring the fluorescent response of materials when excited by radiation, said instrument requiring the use of only a small sample of the material to be analyzed, being highly sensitive, and permitting the continuous activation of a sample and the measurement of resulting fluorescence throughout the ultraviolet and visible regions.

A still further object of the invention is to provide an improved apparatus for spectrometrically analyzing fluorescent materials, said apparatus being applicable for identifying and for quantitatively analyzing a wide range of fluorescent materials and being of sufficient sensitivity so that materials that fluoresce with relatively low intensity can be readily identified and analyzed.

A still further object of the invention is to provide an improved spectro-fluorometer which is provided with means for successively exciting a sample with all the spectral components of white light, for determining the characteristic wavelength or wavelengths to which the sample has major fluorescent response, and for quantitatively analyzing such major response for each of such excitation wavelengths, so that a complete quantitative assay of the fluorescent properties of the sample may be obtained, and so that the material may be accurately identified.

Further objects and advantages of the invention will become apparent from the following description and claims, and from the accompanying drawings, wherein:

Figure 2 is a diagram showing the arrangement of optical elements in a preferred form of spectro-fluorometer constructed in accordance with this invention.

Figure 1:
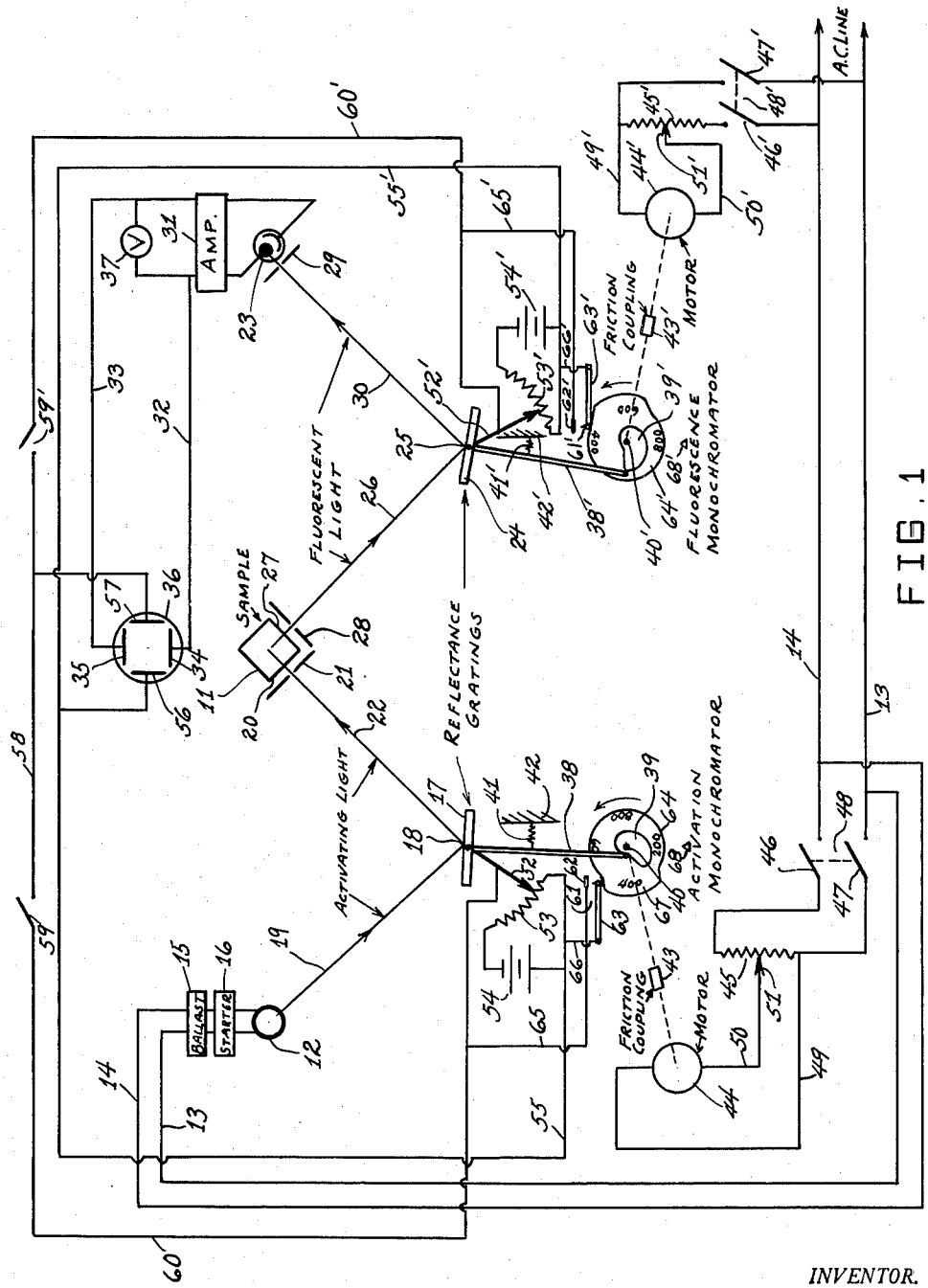
Figure 1 is a schematic diagram illustrating the optical arrangement and basic electrical connections of an improved spectro-fluorometer constructed in accordance with the present invention.

Referring to the drawings, and more particularly to Figure 1, 11 designates a transparent sample cell, for example, a fused quartz cell of square horizontal cross-section, said cell being mounted in any suitable support. Designated at 12 is a line source of white light, for example, a xenon arc lamp having a vertical gap of substantially linear configuration. Said lamp is suitably energized from a pair of supply wires 13, 14 through a conventional ballast 15 and starter 16, as shown.

Designated at 17 is a first reflectance grating which is pivotally mounted on a suitable support, not shown, for oscillation around a vertical axis, for example, on a vertical shaft 18, said grating 17 being located forwardly of and between the arc lamp 12 and the sample cell 11, as viewed in Figure 1, so as to receive a beam of white light 19 from the lamp and to disperse said beam and reflect the spectral components thereof toward one face 20 of the cell 11. A vertical slit plate 21 is provided in front of the cell face 20 so that only one spectral component image of the arc of lamp 12 may enter the cell 11 through face 20 at any given position of reflectance grating 17. The beam carrying the reflected spectral component image is designated at 22 in Figure 1.

Designated at 23 is a photo-sensitive electron device of any suitable type, such as a photo-electric cell, a photomultiplier tube, or the like, which is suitably mounted on the side of cell 11 opposite to lamp 12, as shown. A second reflectance grating 24 is pivoted for oscillation on a vertical axis, being secured, for example, on a vertical shaft 25 located forwardly of and between cell 11 and the photo-sensitive device 23. Grating 24 is located to receive a beam 26 of fluorescent light from a face 27 of cell 11 through a vertical slit plate 28 provided in front of said face. The emission face 27 is adjacent and at right angles to the activation face 20.

The photo-sensitive device 23, for example, a photocell as illustrated, is located to receive on its cathode a spectral component beam 30 reflected from the reflectance grating 24 through a vertical slit plate 29 provided in front of the photo-cell, as shown.

The photo-sensitive device 23 is electrically connected to the input of a suitable amplifier 31 of a conventional type, arranged to develop an output voltage across its output conductors 32, 33 whose magnitude varies in accordance with the intensity of the spectral component beam 30 incident on the cell 23. The conductors 32 and 33 are respectively connected to the opposing vertically spaced deflection plates 34, 35 of a cathode ray oscilloscope 36, whereby the vertical deflection of the cathode beam of the oscilloscope will also vary in accordance with the intensity of the spectral component beam 30.

A voltmeter 37 is connected across the output conductors 32, 33 of amplifier 31 so that the value of the amplifier output voltage may be read at any time.

Reflectance gratings 17 and 24 are of conventional construction, and may comprise plane reflectance gratings similar to Catalogue No. 33–53–08–26 manufactured by Bausch & Lomb Optical Co., Rochester, N.Y.

Grating 17 is provided with an actuating arm 38, rigidly secured thereto and extending forwardly therefrom, as viewed in Figure 1, the end of said arm slidably engaging the periphery of a driving cam 39 secured on a vertical shaft 40 journalled in a suitable support. Arm 38 is biased against the periphery of the cam, namely in a counterclockwise direction, as viewed in Figure 1, by a spring 41 connected between the arm and a stationary support 42. Cam 39 is contoured to rotate reflectance grating 17 at a substantially uniform rate through an angle sufficient to reflect all the visible and ultraviolet spectral components of beam 19 to the vertical slit in plate 21 and to then rapidly allow the grating to return to its starting position under the biasing force of spring 41, in response to the counterclockwise rotation of shaft 40, as viewed in Figure 1, at a uniform rate.

Shaft 40 is coupled through a friction clutch 43 to the shaft of an electric motor 44. Motor 44 is provided with a speed-regulating, manually operated potentiometer 45 connected to the line wires 13, 14 through the poles 46, 47 of a two-pole, manually operated switch 48. Thus, one terminal wire 49 of motor 44 is connected to line wire 13 through pole 47 and the other terminal wire 50 of said motor is connected to the sliding tap 51 of the potentiometer.

Motor 44 may be of any suitable type and is preferably of a slow-speed type having a nominal speed of about four revolutions per minute.

The horizontal sweep of the oscilloscope beam is synchronized with the oscillation of the reflectance grating 17 by a contact arm 52 which is coupled to shaft 18 through conventional gears, not shown, and which slidably engages a potentiometer winding 53 mounted concentrically with said shaft. A battery 54 is connected across said potentiometer winding. The positive terminal of the battery is connected by a wire 55 to one of the horizontally spaced deflection plates 56 of oscilloscope 36. The other horizontal deflection plate 57 is connected to a wire 58, which is in turn connected through a manually-controlled switch 59 and a wire 60 to the contact arm 52.

With switch 59 closed, the horizontal sweep voltage applied across plates 56, 57 increases from a minimum value to a maximum value simultaneously with the clockwise rotation of grating 17. At the end of the horizontal sweep, the plates 56 and 57 are short-circuited by a cam-operated switch 61 having a stationary contact 62 and a resilient contact arm 63 engaging the periphery of a cam disc 64 secured on shaft 40. Contact 62 is connected by a wire 65 to wire 60. Contact arm 63 is connected by a wire 66 to wire 55. Cam disc 64 is provided with a switch-closing portion 67 of enlarged radius which closes switch 61 at the end of the scanning swing of grating 17 and thus removes the sweep voltage from plates 56, 57 until the grating has returned to its starting position, after which disc 64 allows switch 61 to open and allows sweep voltage to be again applied to plates 56, 57.

As will be readily apparent, the periodic voltage applied across horizontal deflection plates 56, 57 will be of sawtooth form and will be synchronized with the sweep of grating 17. The sawtooth voltage is produced by the sawtooth sweep generator comprising contact arm 52, potentiometer winding 53, battery 54, cam member 64, short-circuiting contacts 62, 63, shaft 18, follower arm 38, cam 39 and motor 44.

Cam disc 64 is suitably inscribed with a wavelength scale, and a stationary index marker 68 is provided adjacent the periphery of the disc, said wavelength scale indicating the wavelength of the monochromatic beam 22 in the different angular positions of the grating 17.

Friction clutch 43 is yieldable sufficiently to allow the shaft 40 to be manually rotated by means of cam disc 64 when motor 44 is deenergized, as when switch 48 is opened, so that grating 17 may be manually adjusted to any position thereof, for example, to a position providing a desired constant wavelength of beam 22, as indicated by the scale value on disc 64 adjacent the index marker 68.

From the foregoing description it will be apparent that reflectance grating 17 and the elements associated therewith comprise a means to disperse the spectral components of beam 19 and to reflect said components to the face 20 of cell 11 through the slit plate 21 whereby the cell may be activated either by being scanned successively by all the spectral components of white light, when motor 44 is energized, or by a selected monochromatic spectral component, when motor 44 is deenergized and the cam disc 64 is manually set to provide said desired spectral component in the manner above described.

The reflectance grating 24 is provided with driving means similar to that associated with the grating 17, namely, a drive motor 44' coupled through a friction clutch 43' to a driving shaft 40' to which is secured a grating drive cam 39' whose periphery is slidably engaged by the end of an arm 38' rigidly secured to the pivot shaft 25 of grating 24. Cam 39' is similar to cam 39 and drives grating 24 in the same manner as grating 17 is driven. A biasing spring 41' is connected between arm 38' and a stationary support 42', urging arm 38' against the periphery of cam 40', biasing the grating 24 towards its starting position, and the cam 39' is contoured to return grating 24 rapidly toward said starting position at the end of the clockwise scanning swing of the grating, as viewed in Figure 1.

The horizontal sweep of the oscilloscope beam is synchronized with the scanning movement of grating 24 by the provision of a sweep potentiometer 53' arranged concentrically with shaft 25 and slidably engaged by a contact arm 52' coupled to shaft 25 through conventional gears, not shown. A battery 54' is connected across the winding of potentiometer 53'. Arm 52' is connected by a wire 60' through a manually operated switch 59' to the horizontal deflection plate 57 of the oscilloscope. The positive terminal of battery 54' is connected by a wire 55' to the deflection plate 56.

The wires 55' and 60' are short-circuited at the end of the scanning swing of grating 24 by a shorting switch 61' comprising a stationary contact 62' and a resilient contact arm 63' which engages the periphery of a cam disc 64' contoured to move contact arm 63' into engagement with contact 62' at the end of said scanning swing and to maintain shorting engagement thereof until grating 24 returns to its starting position. Contact 62' is connected to wire 60' by a wire 65'. Switch arm 63' is connected to wire 55' by a wire 66'.

The periodic voltage developed across wires 55', 60' will be of sawtooth form, similar to the sawtooth voltage developed across wires 60, 55 by the energization of motor 44, as previously described, the sawtooth voltage across wires 55', 60' being synchronized with the sweep of grating 24. Thus the elements 52', 53', 54', 64', 62', 63', 25, 38', 39' and 44' comprise a sawtooth sweep generator synchronized with the sweep of grating 24.

Cam disc 64' is provided with a wavelength scale similar to that on disc 64, and with a stationary index marker 68', for reading the scale.

Motor 44' is similar to motor 44 and is speed-adjusted by a potentiometer 45' connected to the line wires 13 and 14 through the poles 46' and 47' of a manually operated two-pole switch 48'. One motor terminal wire 49' is connected to line wire 13 through the switch pole 47' and the other motor terminal wire 50' is connected to the sliding tap 51' of potentiometer 45'.

It will be apparent from the foregoing description that reflectance grating 24 and the elements associated therewith comprise a means to disperse the spectral components of fluorescent beam 26 and to reflect said components to the cathode of photosensitive device 23 through the slit plate 29, whereby the photosensitive device may be excited either by being scanned successively by the spectral components of the fluorescent light from the sample cell 11, when motor 44' is energized, or by a selected monochromatic spectral component of the fluorescent light, when motor 44' is deenergized and the cam disc 64' is manually set to provide said desired spectral component.

The oscilloscope 36 is preferably of a type having a long-persistence phosphor viewing screen, although if rapid scanning speeds are employed for the gratings 17, 24 the oscilloscope screen may be of a shorter-persistence type.

In using the apparatus, if the fluorescent properties of the sample in cell 11 are unknown, the following steps are taken to reveal both activation and fluorescent wavelengths:

(1) The equipment is adjusted until some fluorescence is observed (the amplifier 31 and oscilloscope are set for high sensitivity; switch 59' and switch 48' are closed and the activating wavelength is manually changed in small steps by means of disc 64).

(2) When an activating wavelength is located, the fluorescent scan is stopped (by opening switch 48') and the fluorescent wavelength disc 64' is manually set to a value providing maximum fluorescence (giving a maximum voltage reading on voltmeter 37).

(3) The activating wavelength disc 64 is then readjusted until a new fluorescent maximum is observed on voltmeter 37, and the disc 64 is set at this activating wavelength.

(4) Switch 48' is closed, starting the fluorescent scan, whereby the new fluorescent spectrum is displayed on the oscilloscope screen.

(5) If an activation wavelength (absorption peak) of the sample is known, the activating wavelength disc 64 is set to this value. The fluorescent scan is started by closing switch 48' and the equipment sensitivity is adjusted to obtain the desired display of the fluorescent spectrum.

(6) Similarly, if a fluorescent wavelength is known, the fluorescent wavelength disc 64' is set to this value and the activating wavelength disc 64 is manually adjusted until a maximum indiction of fluorescence is obtained (from voltmeter 37) and the disc 64 is set at this value. By closing the switch 48' the fluorescent scan will be started, and the fluorescent spectrum will be displayed on the oscilloscope screen.

The apparatus may be employed to obtain an "activation spectrum," namely, a curve showing the relation between activating wavelength and fluorescent intensity received at the wavelength of maximum fluorescence. When a sample is activated at a wavelength corresponding to an activation peak, the height of the maximum fluorescent peak in the fluorescent spectrum will be the same as that of the corresponding peak in the activation spectrum. The wavelength corresponding to the highest peak in the fluorescent spectrum is the wavelength of maximum fluorescence produced when the sample is activated by light of the wavelength for maximum fluorescence.

To obtain an activation spectrum, the fluorescent wavelength disc 64' is set to the reading which corresponds to maximum fluorescence; the switch 59 is closed to connect the oscilloscope horizontal deflection plates to the activation scanning system, and the activation scan is started by closing switch 48. Switches 59' and 48' are open, so that grating 24 remains fixed.

Once a fluorescent peak for a compound under assay has been found, this peak will thereafter serve as an indicator for quantitative assay. The fluorescent scan should be stopped and set at the wavelength for maximum fluorescence. In general, for dilute solutions, the fluorescent peak height will be a linear function of concentration.

Figure 2 diagrammatically represents a preferred arrangement of the optical components of the system of the present invention. Designated diagrammatically at 70 is a support formed with a first housing portion 71 containing the activation monochromator components and a second housing portion 72 containing the fluorescence monochromator components. The lamp 12 is mounted in a housing 73 communicating through a passage 74 with the interior of housing portion 71. The light from lamp 12 is reflected from a first concave mirror 75 fixedly mounted in housing portion 71 to the reflectance grating 17, which is pivotally mounted in said housing portion 71 for oscillation on a vertical axis. The dispersed spectral components are reflected from the grating 17 to a second fixed concave mirror 76 mounted in housing portion 71 and are reflected from mirror 76 through a cell shutter 77 into a cell housing 78 in which the transparent sample cell 11 is mounted, and through a slit assembly generally similar to the slit plate 21 of Figure 1. This slit assembly comprises a pair of spaced aligned slit plates 79, 79 located in front of one of the faces of the cell 11, as shown. The wall of cell housing 78 opposite cell shutter 77 is provided with a light trap 80 to receive and suppress the light from beam 22 passing through the sample cell.

The fluorescent light from cell 11, shown as the beam 26, passes through a series of spaced aligned slit plates 81, defining a slit assembly generally similar to the slit plate 28 in Figure 1, into the second housing portion 72, and is reflected from a fixed concave mirror 82 mounted therein to the reflectance grating 24. Grating 24 is pivotally mounted in housing portion 72 for oscillation on a vertical axis. The spectral components of the fluorescent light are reflected from grating 24 as the beam 30, and are reflected from a fixed concave mirror 83 through a photomultiplier shutter 84 into the photomultiplier housing 85 attached to housing portion 72. The beam 30 passes through a slit plate 29 to a photomultiplier tube 23', corresponding to the photo-cell 23 of Figure 1.

The driving means for the reflectance gratings 17 and 24 and the electrical components associated with the apparatus are the same as in Figure 1.

While certain specific embodiments of an improved spectrofluorometer have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a device for measuring the fluorescent response of a fluorescent material, a support formed with a first housing, a second housing extending at a substantial angle to said first housing and having a rear end located adjacent the rear end of the first housing, and an additional housing located between and communicating with the rear ends of said first and second housings, a transparent sample cell adapted to contain fluorescent material mounted in said additional housing, a source of light communicating with the rear end of said first housing, a first reflectance grating pivotally mounted in the rear portion of said first housing and facing forwardly therein, a pair of spaced mirrors mounted in the forward portion of said first housing, one of said mirrors being positioned to reflect light from said source to said grating and the other mirror being positioned to reflect light from said grating to said additional housing and to said sample cell, a cathode ray oscilloscope having vertical deflection means and horizontal deflection means, a further housing communicating with the rear end of said second housing, a photo-sensitive device mounted in said further housing, a second reflectance grating pivotally mounted in the rear portion of said second housing and facing forwardly therein, a second pair of spaced mirrors mounted in the forward portion of said second housing, one of said second mirrors being positioned to reflect light from said sample cell to said second reflectance grating and the other of said second pair of mirrors being positioned to reflect light from said second reflectance grating to said photo-sensitive device, means connecting said photo-sensitive device to said vertical deflection means, means to selectively oscillate said reflectance gratings, respective sawtooth sweep voltage generators associated with said gratings, means constructed and arranged to at times simultaneously drive each grating and its associated sweep generator, means to selectively connect said sweep voltage generators to the horizontal deflection means, and switch means mechanically coupled to the gratings and constructed and arranged to short-circuit the output of each sweep voltage generator substantially at the end of each cycle of oscillation of its associated grating.

2. The structure of claim 1, and wherein said mirrors are rearwardly concave.

3. The structure of claim 1, and wherein said additional housing is provided with a light trap opposite the first housing to receive and suppress light passing through the sample cell.

References Cited in the file of this patent

UNITED STATES PATENTS

| | | |
|---|---|---|
| 2,339,053 | Coleman | Jan. 11, 1944 |
| 2,411,741 | Michaelson | Nov. 26, 1946 |
| 2,444,560 | Feldt et al. | July 6, 1948 |
| 2,602,368 | Barnes | July 8, 1952 |
| 2,635,192 | Cordovi | Apr. 14, 1953 |
| 2,723,589 | Bullock et al. | Nov. 15, 1955 |
| 2,758,502 | Scott et al. | Aug. 14, 1956 |
| 2,835,167 | Pierce | May 20, 1958 |

OTHER REFERENCES

"Electronics in Medical Science," Turner, Radio News; June 1944, pages 32–34.

"Spectrophotofluorometric Assay in the Visible and Ultraviolet," Bowman et al., Science, vol. 122, July 1, 1955, pages 32, 33.